United States Patent [19]
Cornelius et al.

[11] 4,352,464
[45] Oct. 5, 1982

[54] IRRIGATION LINE WIND BRACE

[75] Inventors: Gail Cornelius, Portland; Lloyd C. Olson, Beaverton, both of Oreg.

[73] Assignee: R. M. Wade & Co., Portland, Oreg.

[21] Appl. No.: 212,279

[22] Filed: Dec. 3, 1980

[51] Int. Cl.³ .............................................. A01G 25/02
[52] U.S. Cl. ........................................ 239/713; 188/7
[58] Field of Search ............... 239/177, 709, 712–716, 239/718; 188/7

[56] References Cited

U.S. PATENT DOCUMENTS

| 3,878,860 | 4/1975 | Pritchard | 239/713 |
| 4,006,860 | 2/1977 | Cornelius et al. | 239/716 |

FOREIGN PATENT DOCUMENTS

| 693957 | 9/1964 | Canada | 239/712 |
| 978565 | 11/1975 | Canada | |

*Primary Examiner*—Andres Kashnikow
*Attorney, Agent, or Firm*—Phillips, Moore, Lempio and Finley

[57] ABSTRACT

An irrigation system includes an irrigation line and a wind brace assembly which can be automatically disengaged from the irrigation line preparatory to moving the irrigation line across a field to a new position. The assembly is automatically engaged with the irrigation line in the new position to prevent wind from moving the irrigation line.

15 Claims, 4 Drawing Figures

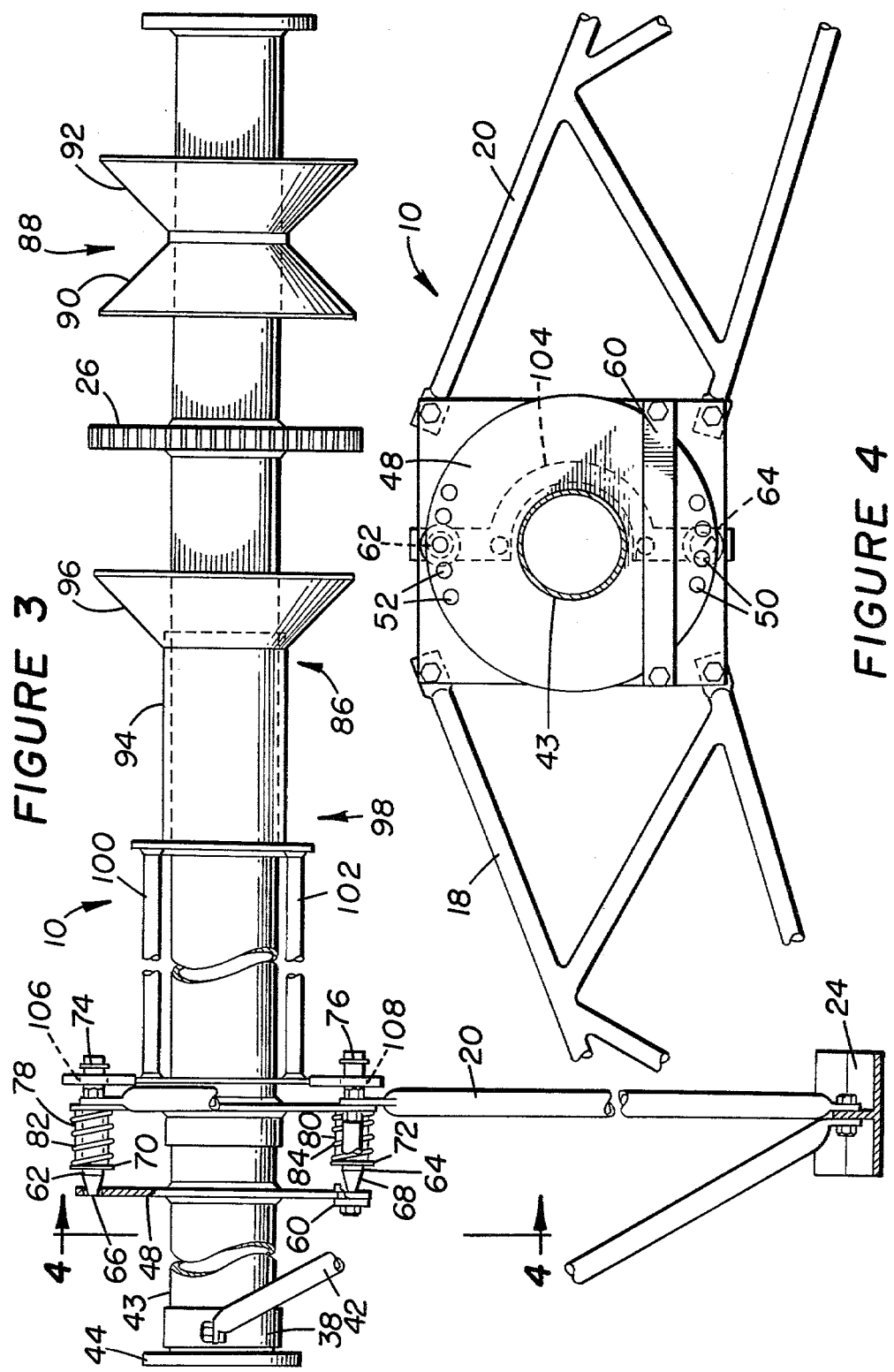

IRRIGATION LINE WIND BRACE

TECHNICAL FIELD

The present invention relates to an irrigation line, and in particular to a wind brace for preventing the irrigation line, once positioned, from being blown across a field by the wind.

BACKGROUND ART

A number of wind braces are presently available for irrigation lines. These wind braces include brace members which are secured to the irrigation line. Preparatory to moving the irrigation line, the brace member must be somehow retracted manually so that as the irrigation line is repositioned, the brace member will not engage the ground. Once the line is repositioned, the brace member must be redeployed in a ground-engaging position so that the position of the line is maintained even in high winds which have been known to push such irrigation lines across a field, interfering with the orderly irrigation thereof.

It can be appreciated that the above wind brace requires additional time to retract and deploy, which could be eliminated with a more efficient system.

Another type of wind brace which is known in the art is one which is pivotally mounted to the irrigation line and includes a sail or wind vane. A high wind is caught by the sail or wind vane and causes the brace to pivot down into ground engaging contact, preventing the line from being blown across the field. Such a device would allow a certain amount of movement to occur before the wind increased to a sufficient force to cause the brace to engage the ground. Consequently, the irrigation pattern could be somewhat irregular. Further, such a brace does not support the line when not engaging the ground. Such support would be desirable during the operation of the line so that the brace supports the line and the weight of the water contained therein.

The present invention is directed to overcoming one or more of the problems as set forth above.

SUMMARY OF THE INVENTION

In an irrigation line supported by and having fixed relative thereto a plurality of wheels, the improvement comprises a brace means for selectively preventing the irrigation line from moving. The brace means includes a brace member, means for mounting said brace member to said irrigation line so that said irrigation line is free to rotate relative to said brace member, means for selectively locking said brace member to the irrigation line, and means for selectively deactuating said locking means.

In an aspect of the invention the locking means includes at least one pin mounted on said mounting means and a locking member secured to the irrigation line, which locking member defines at least one aperture for selectively receiving the pin.

In yet another aspect of the invention the locking means includes a first pin and a second pin mounted on said mounting means and a member having a first aperture and a second aperture, said first aperture for selectively receiving said first pin when said second aperture is misaligned with said second pin and said second aperture for selectively receiving said second pin when said first aperture is misaligned with said first pin.

In yet another aspect of the invention, the deactuating means includes a sleeve rotatably mounted about the irrigation line and an engageable member extending from said sleeve. The deactuation means also includes a guide secured to the irrigation line. In order to deactuate the locking means, a mobile transport assembly includes a pair of members for engaging and simultaneously pulling the engageable member toward the guide for selectively unlocking the brace member from the irrigation line so that the irrigation line can be moved.

Accordingly, the present invention solves the problems of the prior art by providing a brace means which can be locked to the irrigation line in order to prevent the movement of said line across a field, and quite easily can be unlocked automatically from the line preparatory to the repositioning of the line for irrigating a new section of land. Further, as the brace means is always deployed in ground-engaging contact except for the short interval when the line is being repositioned, there is no movement of the line as would be allowed during deployment of the wind actuated brace of the prior art. Additionally, as the brace means is always deployed, said brace can support the line and the water contained therein.

BRIEF DESCRIPTION OF THE DRAWINGS

FIG. 3 is a side elevational view of the wind brace assembly of FIG. 1.

FIG. 4 is an end view of a portion of the wind brace assembly of FIG. 1.

DETAILED DESCRIPTION OF THE PREFERRED EMBODIMENT

Figure 1:
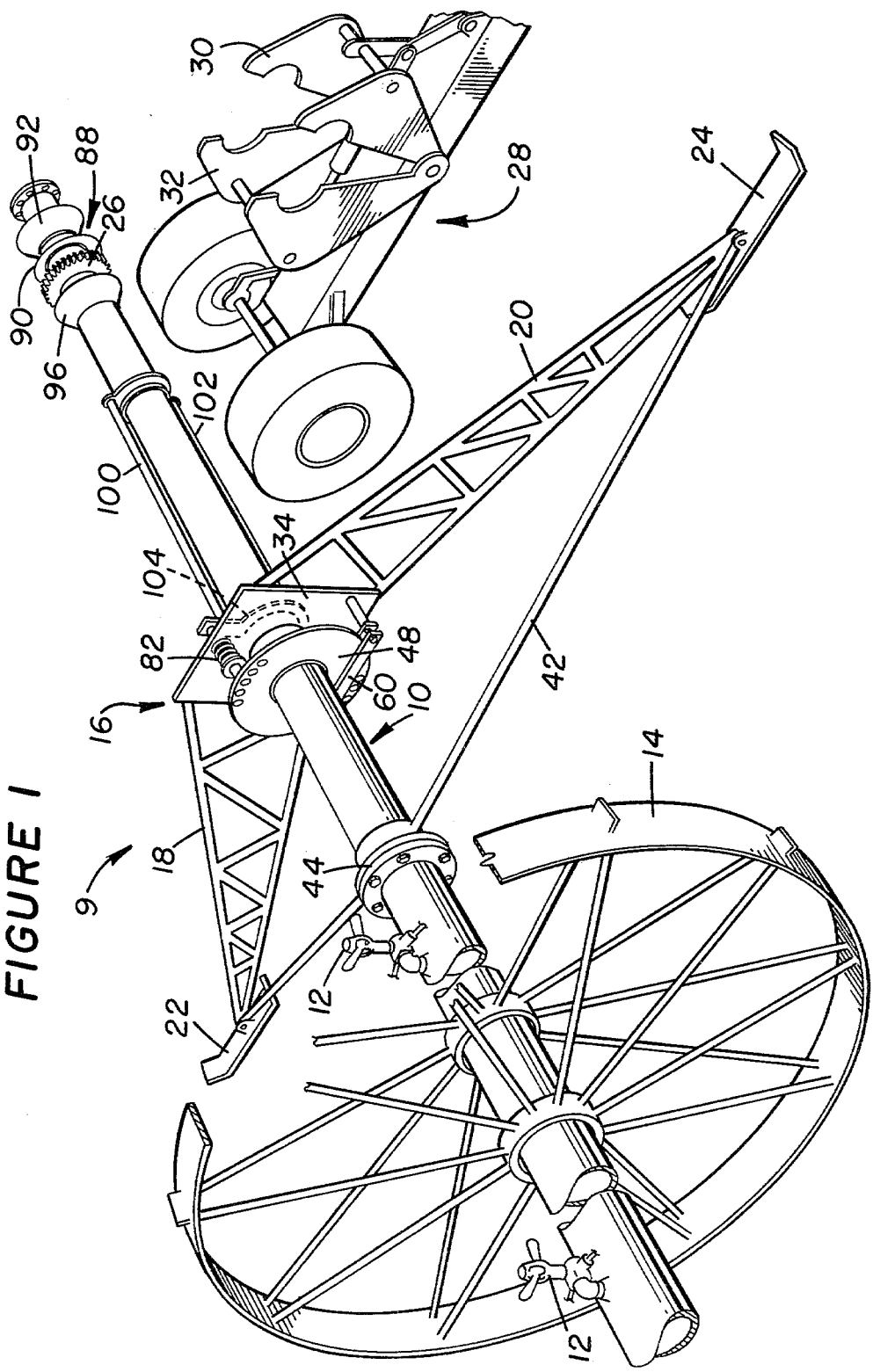
FIG. 1 is a perspective view of an irrigation line and an embodiment of the wind brace assembly of the invention with a mobile transport assembly positioned adjacent thereto.

FIG. 1 depicts an irrigation system 9 which includes an irrigation line 10, a plurality of sprinklers 12 extending at spaced intervals therefrom. Irrigation line 10 can be of the type which is disclosed in U.S. Pat. No. 4,006,860, issued on Feb. 8, 1977, which is incorporated by reference herein. Irrigation line 10 is supported by a plurality of wheels 14, such wheels being secured to the irrigation line 10 at spaced intervals along its length. Mounted to irrigation line 10 is an embodiment of the wind brace assembly 16 of the invention. The wind brace assembly 16 includes first and second stabilizer arm assemblies or brace members 18 and 20, which have ground-engaging skids 22 and 24 fixed to the ends thereof located distally from the irrigation line 10. Also secured to irrigation line 10 is a bull gear 26. Depicted in FIG. 1 is a mobile transport assembly 28 which includes first and second jaw members 30 and 32 which can engage the irrigation line 10 and in particular the bull gear 26 and a portion of the wind brace assembly 16 as will be described hereinbelow. As is fully explained in the above U.S. patent, the mobile transport assembly 28 can move the irrigation line across a field by rotating the bull gear 26 and thus the irrigation line 10 until the irrigation line 10 is repositioned in a desirable location.

Figure 2:
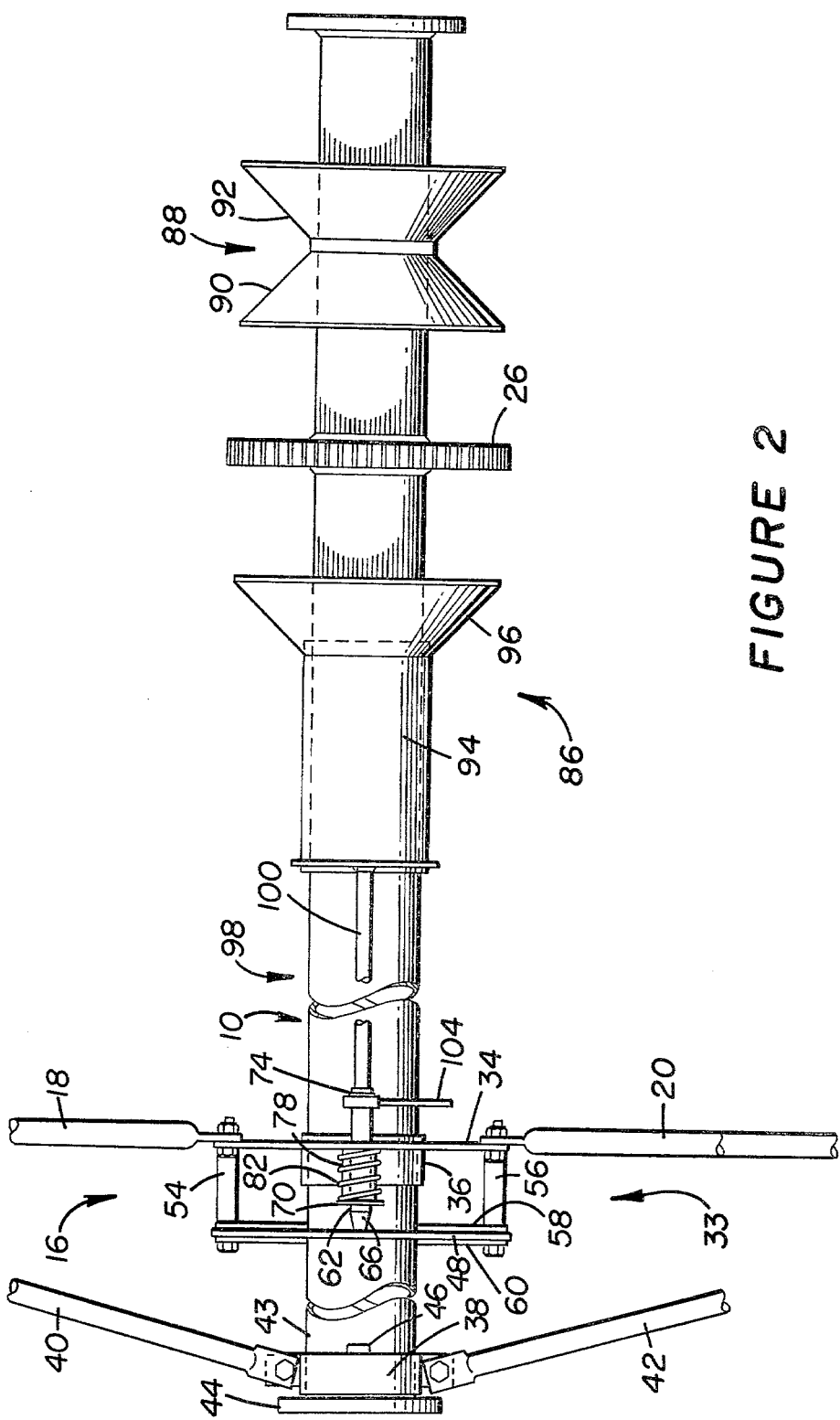
FIG. 2 is a top view of the wind brace assembly of FIG. 1.

In FIGS. 2 and 3, wind brace assembly 16 also includes a locking means 33 having stabilizer plate mount 34 which has a sleeve 36 that is rotatably mounted upon irrigation line 10. In actual practice, as will be described hereinbelow, the sleeve 36 is held relatively stationary and the irrigation line 10 is rotated inside thereof. First and second brace members 18 and 20 are secured to and extend from stabilizer plate mount 34. In FIG. 1, first and second brace members 18 and 20 include two elongated members which meet at the respective skids 20 and 24 with web members securing the members together. A second sleeve or brace terminal stabilizer 38 is rotatably mounted on the line 10 and spaced from the first sleeve 36. The second sleeve 38 mounts brace stabilizer members 40 and 42 which are secured to the distal ends of brace members 18 and 20 adjacent the skids 22 and 24 thereof. Second sleeve 38 is positioned between an end flange 44, which is used to secure one section of tubing 43 for the irrigation line 10 to an adjacent section, and a retaining stop or boss 46. Again, in actuality, the irrigation line 10 can rotate relative to a stationary second sleeve 38.

Secured to the irrigation line 10 as, for example, by welding, is a disc-shaped pin hole plate or member 48 (FIG. 4), which includes a first plurality of four apertures 50 equally spaced along one portion of the periphery thereof and a second plurality of five apertures 52 equally spaced along a second portion of the periphery thereof. The apertures of first plurality 50 are diametrically opposed to a point intermediate two of the apertures of second plurality 52. Conversely, the apertures of the second plurality 52 are diametrically opposed to a point intermediate two of the apertures of the first plurality 50. Extending from stabilizer plate mount 34 are first and second posts or bushings 54 and 56 to which are mounted first and second bars 58 and 60. Bars 58 and 60 are located on opposite sides of pin hole plate 48 and the space between said bars 58 and 60 is slightly greater than the thickness of pin hole plate 48. Pin hole plate 48 is able to turn between the bars 58 and 60 while the bars enable the stabilizing plate mount 34 to maintain a position relative thereto as the irrigation line 10 rotates within sleeve 36 of the stabilizer plate mount 34.

Mounted through two apertures in stabilizer plate 34 are first and second index pins 62 and 64 (FIG. 3) of locking means 33. Pins 62 and 64 include conical ends 66 and 68 and flats or washers 70 and 72 secured thereto adjacent conical ends 66 and 68. Located at the other end of said pins 62 and 64 and on the opposite side of stabilizer plate mount 34 are snap rings 74 and 76 which will be described more fully hereinbelow. Located about each pin 62 and 64 is a sleeve 78 and 80. Mounted concentrically about sleeves 78 and 80 are compression springs 82 and 84, respectively, which urge washers 70 and 72 and thus index pins 62 and 64 away from stabilizer plate mount 34 and towards pin hole plate 48. Index pins 62 and 64 comprise a means for selectively locking the brace members 18 and 20 to the pin hole plate 48 and thus to the irrigation line 10.

Means for selectively deactuating said locking means and thus allowing the irrigation line 10 to rotate freely from the wind brace assembly 16 is denoted by the numeral 86 and includes a rotating cone assembly or guide 88 which includes first and second cones 90 and 92 which are secured to irrigation line 10 and which form a V-shape. Said guide 88 is located on the other side of bull gear 26 from stabilizer plate mount 34. The means 86 for deactuating the lock means 33 further includes a sleeve 94 which is mounted adjacent to bull gear 26. Irrigation line 10 can rotate within sleeve 94. Extending from sleeve 94 is a conical engageable member 96 which extends outwardly toward bull gear 26. A pin yoke assembly 98 is secured to sleeve 94 and includes first and second rods 100 and 102 which extend to a position adjacent first and second index pins 62 and 64 which have a longitudinal axis which is substantially parallel with but slightly spaced from the longitudinal axis of the index pins 62 and 64. Rods 100 and 102 are in fact inboard of the index pins 62 and 64 as can be seen in FIG. 3. Joining rods 100 and 102 at a position adjacent the index pins 62 and 64 is a U-shaped yoke 104. Yoke 104 includes apertures 106 and 108 through which index pins 62 and 64 are respectively disposed. As is evident from FIGS. 2 and 3, snap rings 74 and 76 maintain the index pins in said apertures 106 and 108 such that when the sleeve 94 is urged toward the bull gear 26, the yoke 104 pulls index pins 62 and 64 towards said bull gear 26, and when the sleeve 94 is allowed to be urged away from bull gear 26 by the action of compression springs 82 and 84, the index pins 62 and 64 can act independently so that one of the pins can be properly seated in one of the apertures of the first or second plurality of apertures 50 and 52 to cause the wind brace assembly 16 to be locked to the irrigation line 10.

At this point in an ideal situation, one of the index pins 62,64 is properly aligned with one of the plurality of apertures 50,52 and thus is disposed through one of the apertures and locks the brace members 18 and 20 to the pin hole plate 48. The other of pins 62,64 would contact the pin hole plate 48 halfway between the two apertures of the other plurality of apertures 50,52. Should both pins 62,64 be not aligned, the pins 62,64 would contact the pin hole plate 48 without being disposed through any of the apertures. If a slight wind should occur, the line would rotate an infinitesimal amount until one of the pins was disposed in one of the pluralities of apertures. When the mobile transport assembly 28 is removed from the line, the line about the wind brace assembly 16 is lower so that the skids 22 and 24 again engage the ground.

As the pins 62 and 64 are free to slide through the apertures of the yoke 104, the fact that one of the pins is not disposed in one of the apertures does not prevent the other pin from being disposed in one of the apertures.

Pins 62,64 act independently when they move in a direction toward the pin hole plate 48, while both are able to be pulled therefrom by the sleeve 94 as the sleeve 94 is pulled towards bull gear 26.

The operation of the invention is as follows. Mobile transport assembly 28 is driven adjacent system 9 and the jaw members 30 and 32 thereof are positioned about bull gear 26. The jaw members 30 and 32 are closed on line 10 such that a gear of mobile transport assembly 28 engages bull gear 26 and such that jaw members 30 and 32 close on guides 88 and conical engageable member 96. Jaw members 30 and 32 slide down on member 96, urging it toward guide 88. Simultaneously, one of pins 62,64 is disengaged from pin hole plate 48 and both pins 62,64 are pulled away from said plate 48. Also simultaneously with the engagement of the jaw members 30 and 32 with the line 10, the jaw members 30 and 32 lift the line 10 in the vicinity about the jaw members 30,32 so that the skids 22,24 of the wind brace assembly 16 are spaced above the ground.

Next, the mobile transport assembly 28 through bull gear 26 causes line 10 to rotate and thus be repositioned in the field. The wind brace assembly 16 is carried on line 10 and is translated across the field, but does not rotate.

Once the line 10 is repositioned, the jaw members 30,32 are disengaged from line 10 allowing said pins 62,64 to contact mount 34 and if aligned allows one of the pins 30,32 to be disposed in one operative of the two pluralities of apertures 50,52, as described above. Simultaneously, the skids 22,24 are lowered into engagement with the field to again support the line 10. The mobile transport assembly 28 is then driven away from line 10.

This assembly 16, as can be appreciated from the above, is redundant such that if for some reason one of the pins is inoperative, the other pin is fully capable of locking the brace members 18 and 20 relative to irrigation line 10. Further, the system allows for a half-step so that there is a greater opportunity for the line to be initially positioned so that one of the pins will drop into one of the apertures of the plurality of apertures or allow the irrigation line 10 to proceed down the field only a very short distance before one of the pins drops into one of the apertures of the plurality of apertures.

The above system is quite advantageous over the prior art in that it can be automatically operated simultaneously with the movement of the irrigation line across the field and thus does not require manual steps to retract and deploy as is required by the prior art.

Other aspects, objects and advantages of this invention can be obtained from a study of the drawings, the disclosure, and the appended claims.

I claim:

1. In an irrigation line supported by and having fixed relative thereto a plurality of wheels, the improvement comprising:
   brace means for selectively preventing the irrigation line from moving including:
   a brace member having a ground engaging member;
   means for mounting said brace member to said irrigation line so that said irrigation line is free to rotate relative to said brace member;
   means for selectively locking said brace member to the irrigation line; and
   means for selectively deactivating said locking means.

2. The apparatus of claim 1 wherein said locking means include:
   at least one pin mounted on said mounting means; and
   a locking member secured to the irrigation line, which locking member defines at least one aperture for selectively receiving said pin.

3. The apparatus of claim 1 wherein said locking means include:
   a first pin and a second pin mounted on said mounting means; and
   a locking member having a first aperture and a second aperture, said first aperture for selectively receiving said first pin when said second aperture is misaligned with said second pin, and said second aperture for selectively receiving said second pin when said first aperture is misaligned with said first pin.

4. The apparatus of claim 2 including means for biasing said pin toward said locking member.

5. The apparatus of claim 3 including means for biasing said first and second pins toward said locking member.

6. The apparatus of claim 1 wherein said deactuating means includes:
   a sleeve rotatably mounted about the irrigation line; and
   an engageable member extending from said sleeve.

7. The apparatus of claim 6 wherein said engaging member is conical.

8. The apparatus of claim 6 wherein said actuating means includes:
   a guide secured to the irrigation line.

9. The apparatus of claim 8 wherein said guide includes a cone assembly.

10. The apparatus of claim 1 wherein said locking means includes first and second pins;
    said actuating means including means for engaging said pins simultaneously to pull said pins in one direction and said engaging means for allowing said pins to move independently in a reverse direction.

11. The apparatus of claim 1 wherein said locking means include:
    a first pin and a second pin mounted on said mounting means; and
    a member having a first plurality of apertures and a second plurality of apertures, one of said first plurality of apertures for selectively receiving said first pin when said second pin is misaligned with any of said second plurality of apertures and one of said second plurality of apertures for selectively receiving said second pin when said first pin is misaligned with any of said first plurality of apertures.

12. The apparatus of claim 1 wherein said actuating means includes a sleeve rotatably mounted on the irrigation line having an engageable member extending from said sleeve; and
    a guide secured to said irrigation line, wherein said engageable member can be urged toward said guide for unlocking said brace member from the irrigation line.

13. In an irrigation line supported by and having fixed relative thereto a plurality of wheels and a mobile transport assembly means for selectively moving said irrigation line on said wheels, the improvement comprising:
    a brace member having a ground engaging member;
    means for mounting said brace member to said irrigation line so that said irrigation line is free to rotate relative to said brace member;
    means for selectively locking said brace member to the irrigation line; and
    means for selectively deactuating said locking means preparatory to the mobile transport assembly moving the irrigation line.

14. The apparatus of claim 13 wherein the mobile transport assembly means includes a pair of members for engaging said irrigation line and wherein said deactuating means includes a sleeve rotatably mounted on the irrigation line having an engageable member extending from said sleeve and a guide secured to said irrigation line, and wherein said pair of members of said mobile transport assembly urges said engageable member toward said guide to deactuate said locking means preparatory to moving the irrigation line.

15. In combination, an irrigation line and a brace means for selectively preventing the irrigation line from moving, wherein the brace means includes:
    a brace member having a ground engaging member;
    means for mounting said brace member to said irrigation line so that said irrigation line is free to rotate relative to said brace member;
    means for selectively locking said brace member to the irrigation line; and
    means for selectively deactuating said locking means.

* * * * *